(12) United States Patent
Goodman

(10) Patent No.: US 6,333,861 B1
(45) Date of Patent: Dec. 25, 2001

(54) LOW LOSS SNUBBER AND TRANSFORMER RESET CIRCUIT FOR FORWARD CONVERTERS

(75) Inventor: Malcolm Goodman, Chemlsford (GB)

(73) Assignee: Astec International Limited, Hong Kong (HK)

( * ) Notice: Subject to any disclaimer, the term of this patent is extended or adjusted under 35 U.S.C. 154(b) by 0 days.

(21) Appl. No.: 09/589,041

(22) Filed: Jun. 6, 2000

(51) Int. Cl.[7] .................................................. H02M 3/335

(52) U.S. Cl. .............................................. 363/20; 363/56

(58) Field of Search .................................. 363/20, 56, 21, 363/132

(56) References Cited

U.S. PATENT DOCUMENTS

| | | | |
|---|---|---|---|
| 5,278,748 | * 1/1994 | Kitajima | 363/56 |
| 5,828,559 | * 10/1998 | Chen | 363/56 |
| 6,008,630 | * 12/1999 | Prasad | 323/222 |

* cited by examiner

*Primary Examiner*—Adolf Deneke Berhane
(74) *Attorney, Agent, or Firm*—Coudert Brothers

(57) ABSTRACT

A forward converter incorporating a low loss snubber and transformer reset circuit is disclosed. The transformer core of the forward converter is reset by the exchange of magnetizing energy between the transformer secondary winding and an appropriately sized capacitor of the reset circuit during the off period of the power switch. The exchange of magnetizing energy from the capacitor to the transformer secondary winding is independent of power switch operation.

8 Claims, 4 Drawing Sheets

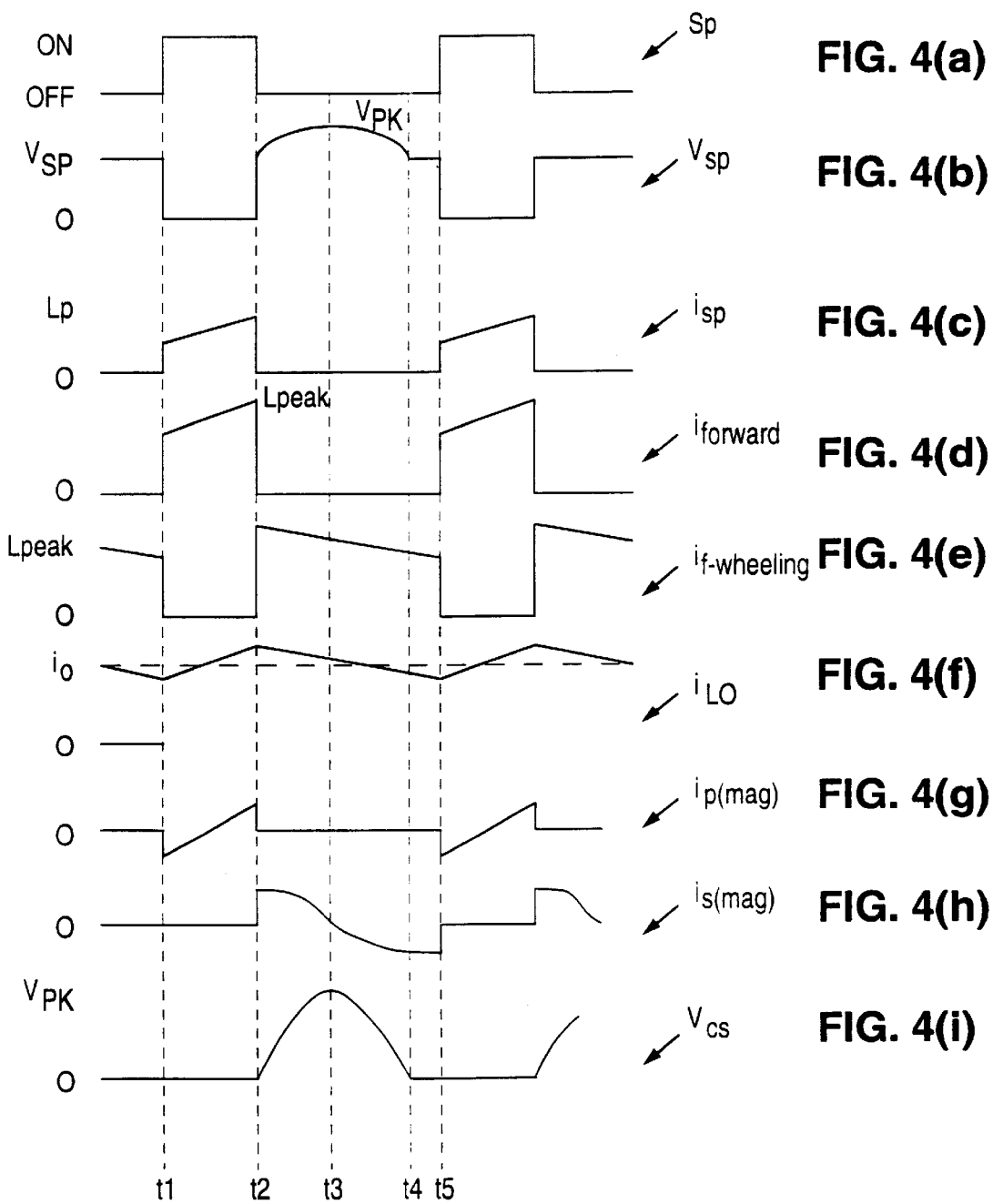

LOW LOSS SNUBBER AND TRANSFORMER RESET CIRCUIT FOR FORWARD CONVERTERS

FIELD OF THE INVENTION

The present invention generally relates to forward converters and, more particularly, to a low loss snubber and transformer core reset circuit used in forward converters.

BACKGROUND OF THE INVENTION

The forward converter is the preferred power supply topology for many applications, including providing power to telecommunications equipment. Forward converters provide a regulated output voltage to a load which is smaller than the input voltage supplied by an associated input power supply. A conventional forward converter 10 is illustrated in FIG. 1. As shown in FIG. 1, a power switch S1 is coupled in series with the primary winding 14 of a transformer. Coupled in parallel across the primary winding 14 is an RCD network comprising a resistor 16, a capacitor 17 and a diode 18. The RCD network is used to reset the transformer core of the converter by recycling the magnetizing energy from the primary winding 14 of the transformer back to the input supply of the converter during the off period of S1. It also limits the peak voltage across S1. The secondary side of the converter 10 includes a forward rectifier 20 coupled to the secondary winding 15 of the transformer, a free-wheeling rectifier 22 and an output filter consisting of choke inductance 24 and capacitor 26. The output filter provides a substantially dc output voltage to a load $R_L$.

The conductivity of S1 is controlled by applying a suitable waveform to the gate 12 of S1. The waveform applied to the gate 12 of S1 is typically provided by a feedback control circuit (not shown) which supplies a pulsed control signal using pulse width modulation (PWM), for example, to regulate the output voltage level. When S1 is turned on, i.e. conducting, the input voltage, $V_{IN}$, is applied across the primary winding 14 of the transformer. A secondary voltage $V_S$ is developed across a secondary winding 15 of the transformer and is applied across the forward output rectifier 20. Current and power flows to the choke inductor 24 and output capacitor 26 (which forms an LC output filter) and the load, $R_L$. Assuming the output capacitor 26 is sufficiently large and ignoring diode drops and losses, the voltage across the choke inductor 24 will be equal to $V_S - V_{OUT}$. In this fashion, the current flowing in the choke inductor 24 will increase linearly with time and can be described by $di_L/dt = (V_S - V_{OUT})/L_O$, where $L_O$ is the size of the choke inductor 24.

When S1 is turned off. i.e., rendered non-conducting, the secondary voltage $V_S$ will reverse. However, the current in the choke inductor 24 will continue to flow in the forward direction rendering the free-wheeling diode 22 conductive. This permits the current to continue to circulate in the circuit loop bounded by the free-wheeling diode 22, choke inductor 24, output capacitor 26 and load $R_L$. The current in the choke inductor 24 then decreases with time and may be represented by $di_L/dt = -V_{OUT}/L_O$.

A drawback associated with conventional forward converters, as described above, is that the RCD network connected across S1 can be a significant source of power loss. Power is lost in resistor 16 when switch S1 is on during the time that capacitor 17 is discharging, and when switch S1 is off during the time that a magnetizing energy is being returned to the input supply of the converter. The highest power loss is typically due to the discharging of capacitor 17 and this power loss increases with larger values of capacitor 17 capacitance. The value of capacitor 17 is selected to minimize the peak voltage as switch S1 turns off and to provide a half cycle reset via the transformer primary winding 14. Generally, the value of capacitor 17 is selected for the transformer reset function since it is greater than the value of capacitance required to minimize the peak voltage due to the effects of the leakage inductance of the transformer.

SUMMARY OF THE INVENTION

The aforementioned and related drawbacks associated with switching losses in conventional forward converters are substantially reduced or eliminated by the present invention. The present invention is directed to a forward converter employing a novel low loss snubber and transformer reset circuit which: (1) resets the transformer core of the forward converter by exchanging energy with the secondary winding inductance of the transformer when the power switch is turned off; and (2) eliminates the power loss associated with forward converters caused by primary side RCD networks. The low loss snubber and transformer reset circuit also reduces the voltage stresses across the power switch and the forward rectifier by making the resonant frequency of the secondary winding inductance and the snubber capacitor of the network less than the switching frequency of the power switch.

In an exemplary embodiment of the present invention, the forward converter comprises a transformer having a primary winding and a secondary winding; a power switch connected in series with the transformer and coupled to an input power source, the power switch capable of being alternately switched between an on period and an off period such that an ac voltage is generated across the secondary winding of the transformer in response thereto; an output filter operative to provide a substantially constant dc voltage to an output load; a forward rectifier operative to provide a forward conduction path between the secondary winding and the output filter; a freewheeling rectifier operative to provide a secondary side current path in connection with the output filter; and a snubber network circuit coupled between a secondary winding and the freewheeling rectifier and operative to reset the transformer core during the off period of the power converter.

An advantage of the present invention is that it provides a resonant reset circuit which provides a half cycle reset of the transformer of the forward converter.

Another advantage of the present invention is that it improves the operating efficiency of forward converters by minimizing the power loss associated with transformer reset and snubber circuits used in forward converters.

Still yet another advantage of the present invention is that it is easy to manufacture and implement.

A feature of the present invention is that it is inexpensive to manufacture.

BRIEF DESCRIPTION OF THE DRAWINGS

The aforementioned and related advantages and features of the present invention will become apparent upon review of the following detailed description of the invention, taken in conjunction with the following drawings, where like numerals represent like elements, in which:

FIGS. 4(a)–4(i) are waveforms which illustrate the operation of the components of the forward converter illustrated in FIG. 2;

DETAILED DESCRIPTION OF THE INVENTION

Figure 1:
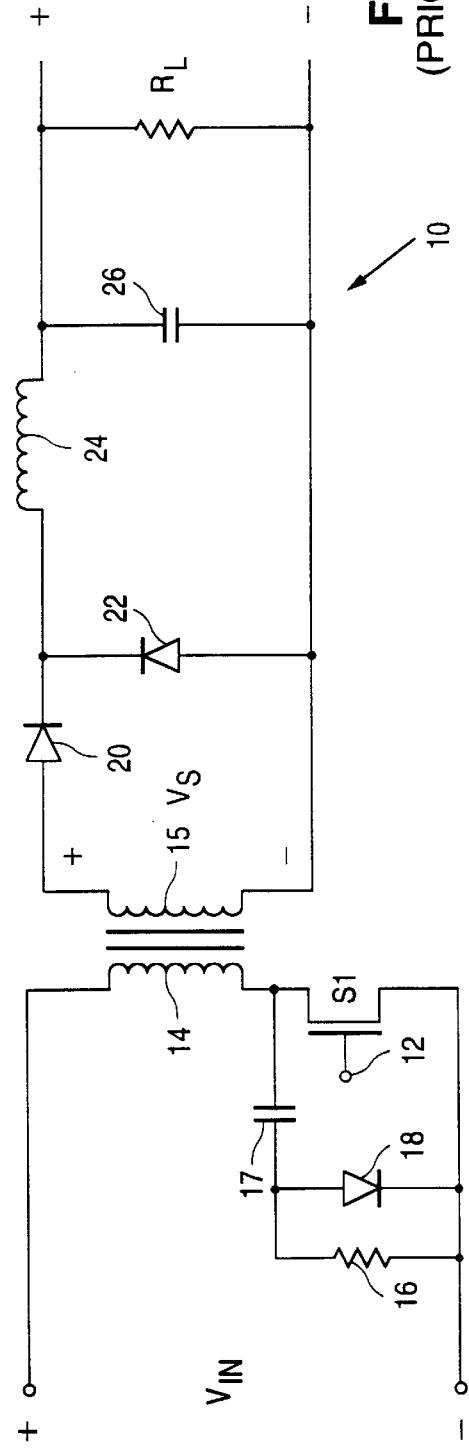
FIG. 1 is a schematic diagram of a conventional forward converter.
Figure 2:
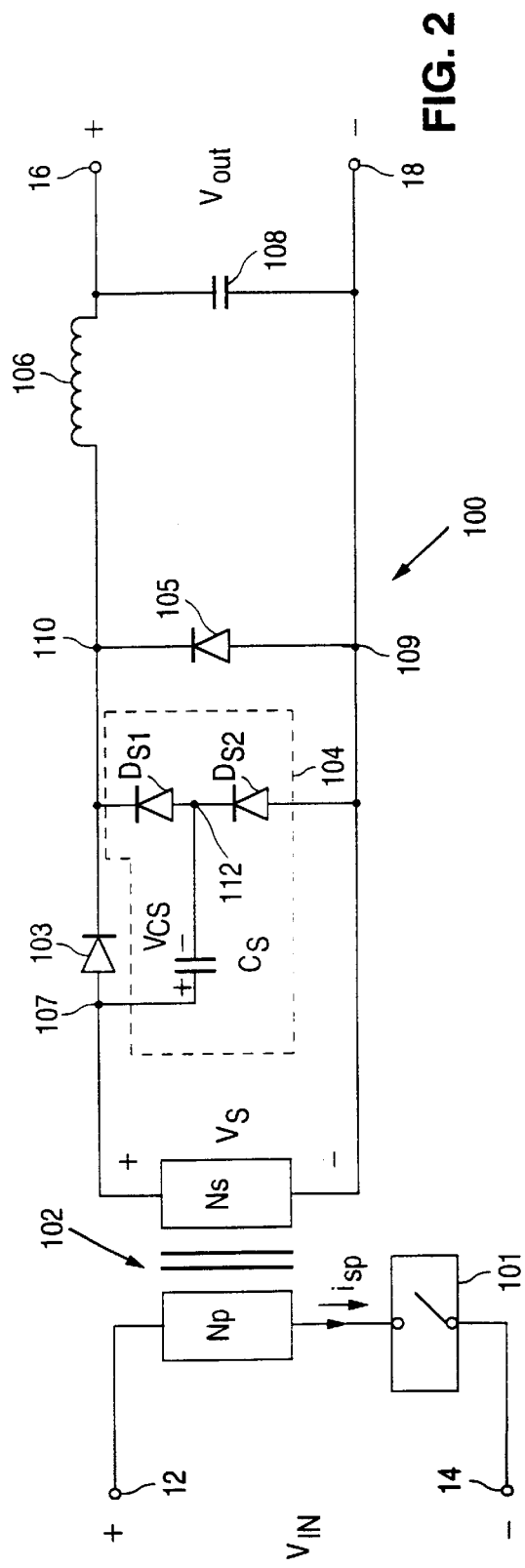
FIG. 2 is a schematic diagram of a forward converter incorporating the low loss snubber and transformer reset circuit according to the present invention.

The forward converter of the present invention will now be described with reference to FIGS. 2–7. FIG. 2 is a schematic diagram of a forward converter 100 incorporating the low loss snubber and transformer reset circuit according to the present invention. In an exemplary embodiment of the present invention, a power switch 101 is connected in series with the primary winding $N_P$ of a power transformer 102. The primary winding $N_P$ of the transformer 102 and the power switch 101 are connected across an input dc voltage source at nodes 12 and 14. The power switch 101 is alternately switched between an on period and an off period in response to a signal provided to the control gate of the power switch 101 by a signal generator (not shown). In an exemplary embodiment, the power switch 101 may be implemented as a metal oxide semiconductor field effect transistor (MOSFET), or comparable device. Also, in an exemplary embodiment, the signal generator is a pulse width modulated (PWM) signal generator operative to provide regulation of the output voltage $V_{OUT}$ appearing on output terminals 16, 18. In an alternate embodiment, a variable time signal generator may also be used. The signal provided by the signal generator is generated in response to a feedback signal from a network (not shown) which is responsive to the output voltage, $V_{OUT}$, of the forward converter 100. The alternating states of the power switch 101 causes an ac voltage to be generated across the secondary winding $N_S$ of the transformer 102.

On the secondary side of the forward converter 100, the secondary winding $N_S$ of the transformer 102 is coupled to a forward rectifier 103 at node 107. In an exemplary embodiment of the present invention, the forward rectifier 103 is a diode having an anode coupled to node 107 and a cathode coupled to an output inductor 106 at node 110. A free-wheeling rectifier 105 is coupled between node 110 and the negative voltage rail of the forward converter 100 and is operative to shunt the secondary side current and provide a conduction path bounded by the output inductor 106 and an output capacitor 108 during the off period of the power switch 101. In an exemplary embodiment, the free-wheeling rectifier 105 is a diode having an anode coupled to node 109 and a cathode coupled to node 110.

Figure 3:
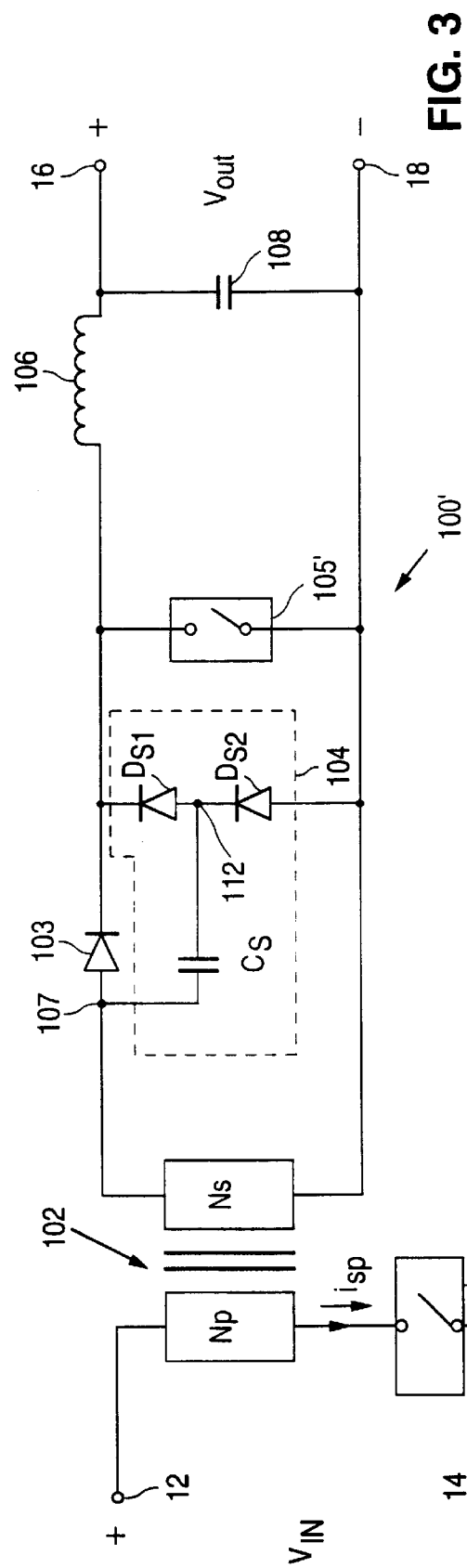
FIG. 3 is a schematic diagram of an alternate embodiment of the forward converter illustrated in FIG. 2.

In an alternate embodiment of the present invention, as shown in FIG. 3, a synchronous rectifier switch 105' can replace the free-wheeling rectifier 105 to shunt the secondary side current and provide a secondary side current path bounded by the output inductor 106, the output capacitor 108 and the synchronous rectifier switch 105'. In an exemplary embodiment, the synchronous rectifier switch 105' is implemented as a MOSFET.

Returning to FIG. 2, the snubber and transformer reset circuit 104 consists of a first snubber diode $D_{S1}$, a second snubber diode $D_{S2}$, and a snubber capacitor $C_S$. This circuit is placed between the secondary winding $N_S$ of the transformer 102 and the free-wheeling rectifier 105 and is operative to exchange magnetizing energy between the secondary winding inductance and the snubber capacitor $C_S$ during the off period of the power switch 101. By exchanging magnetizing energy with the secondary winding inductance, the snubber and transformer reset circuit 104 acts as a resonant circuit which resets the transformer core during the off period of the power switch 101. In an exemplary embodiment, the first snubber diode $D_{S1}$ has a cathode connected to the cathode of the forward rectifier 103. The anode of the first snubber diode $D_{S1}$ is in series communication with the cathode of the second snubber diode $D_{S2}$. The anode of the second snubber diode $D_{S2}$ is coupled to the negative voltage rail of the forward converter 100 at node 109. The series interconnected first and second snubber diodes are coupled in parallel across the freewheeling rectifier 105. The snubber capacitor $C_S$ is connected between node 112. the midpoint of the series interconnected first snubber diode $D_{S1}$ and the second snubber diode $D_{S2}$ and node 107, where the secondary winding $N_S$ of the transformer 102 is coupled to the anode of the free-wheeling rectifier 103.

An output filter consisting of the output inductor 106 in series communication with an output capacitor 108 is coupled in parallel to the free-wheeling rectifier 105 and is operative to provide a substantially ripple free and constant dc voltage $V_{OUT}$ to a load.

The characteristics of the transformer used in the forward converter 100 of the present invention and the components that comprise the snubber and transformer reset circuit 104 and output filter are as follows:

| | |
|---|---|
| $N_P$ | 42 turns, 319 $\mu$H |
| $N_S$ | 9 turns, 14.6 $\mu$H |
| $C_S$ | 10 nF–20 nF |
| 106 | 24 $\mu$H |
| 108 | 1000 $\mu$F |

It should be noted that the components used in the snubber and transformer reset circuit are selected based on the operating frequency of the converter and the required output voltage level of the converter. In a preferred embodiment of the present invention, the converter is designed to have a transformer half cycle time of about 1.4 $\mu$s and an operating frequency of 360 kHz. Accordingly, in a preferred embodiment, $C_S$ has a value of 13 nF.

The operation of the forward converter 100 will now be described with reference to FIGS. 4(a)–4(i). FIGS. 4(a)–4(i) are a series of waveforms illustrating the operating features of the components present in the forward converter 100. FIG. 4(a) is a waveform illustrating the conducting state of the power switch 101 as a function of time. FIG. 4(b) is a waveform illustrating the voltage across the power switch $V_{SP}$ as a function of time. FIG. 4(c) is a waveform illustrating the current, $i_{sp}$, flowing through the primary winding $N_P$ of the transformer 102 as a function of time. FIGS. 4(d)–4(f) are waveforms illustrating the current flowing through the forward rectifier 103, free-wheeling rectifier 105, and output inductor 106, respectively, as a function of time. FIG. 4(g) is a waveform illustrating the transformer magnetizing current in the primary winding $N_P$ of the transformer 102 as a function of time. FIG. 4(h) is a waveform illustrating the transformer magnetizing current in the secondary winding $N_S$ of the transformer 102 as a function of time. FIG. 4(i) illustrates the voltage across the snubber capacitor $V_{CS}$ as a function of time.

At time t1, the power switch 101 is turned on, i.e., conducting, which initiates the on period. During this period, $V_{SP}$, the voltage across the power switch 101 goes to substantially zero volts and current flows through the power switch 101. The input voltage $V_{IN}$ is impressed upon $N_P$, causing the magnetic flux across the transformer core to increase with time. Corresponding with the magnetic flux increase, is an increase in the magnetizing current through $N_P$. This causes a secondary side voltage $V_S$ to be developed across $N_S$ of the transformer 102. During the on period (t1–t2) of switch 101, or the forward power cycle of the converter, $V_S$ causes a current $i_{forward}$ to flow through the forward rectifier 103 and output inductor 106 as shown in FIGS. 4(d) and 4(f). During the forward power cycle, the free-wheeling rectifier 105 is reversed biased. Thus, during the on period of the power switch 101, the forward converter 100 operates in a conventional fashion.

At time t2, switch 101 is turned off, thereby initiating the off period. The off period can be represented as containing three parts or time periods. The first part of the off period is represented by the time interval t2–t3. The second part of the off period is represented as the time interval t3–t4. The third part of the off period is represented as the time interval t4–t5. At time t2, conduction of the magnetizing current is transferred from $N_P$ to $N_S$ and $V_S$ reverses polarity. During the first part of the off period (t2–t3), the forward rectifier 103 is reversed biased and the transformer magnetizing current $i_{s(mag)}$ in the secondary winding $N_S$ is transferred to the snubber capacitor $C_S$ via the second snubber diode $D_{S2}$, which charges the snubber capacitor $C_s$. During this time period, the voltage across the snubber capacitor $C_S$ increases to a maximum voltage $V_{PK}$. The voltage $V_{CS}$ across the snubber capacitor $C_S$ reaches it peak value at time t3 according to the following formula:

$$V_{PK}=V_{IN,MIN}\times[\pi/2]\times[D_{MAX}/1-D_{MAX}]$$

where $D_{MAX}$ is the maximum duty cycle of switch 101 and $V_{IN,MIN}$ is the minimum input voltage. At time t3, the transformer magnetizing current $i_{s(mag)}$ in the secondary winding $N_S$ is substantially zero and the voltage $V_{SP}$ across switch 101 is equal to the voltage across the snubber capacitor, $V_{PK}$. At this point, the peak reverse voltage across the forward rectifier 103 is $V_{PK}$.

During the second part of the off period (t3–t4), the magnetizing current is negative and discharges the snubber capacitor $C_S$, $_{via\ DS1}$ and the free wheel rectifier 105, resulting in the previously stored magnetizing energy to be transferred from $C_S$ to the secondary winding of the transformer. At time t4, the transfer of the magnetizing energy is complete, $V_{CS}$ has discharged to zero volts and the transformer core has been reset. At time t4, $i_{s(mag)}$ flows through forward rectifier 103 and the free-wheeling rectifier 105. Thus, as discussed above, the snubber and transformer reset circuit 104 acts as a resonant circuit which resets the transformer core by recycling the magnetizing energy back into the secondary winding of the transformer during the off time of switch 101. In a preferred embodiment of the present invention, the size of $C_S$ was selected so that the resonant circuit 104 provides a half cycle reset of the transformer via $N_S$.

During the third part of the off period (t4–t5), the output current continues to circulate through the secondary side of the forward converter 100 bounded by the free-wheeling rectifier 105, the output inductance 106 and the output capacitor 108. In addition, the secondary transformer magnetizing current continues to flow through forward rectifier 103 and free-wheeling rectifier 105.

At time t5, the switch 101 is again turned on, thereby initiating a subsequent on period. At time t5, $V_{CS}$ is substantially zero and is isolated from the transformer by the first snubber diode $D_{S1}$. This ensures that $C_S$ is only operative when the switch 101 turns off. As the discharging of the snubber capacitor is completed before the start of the next forward power cycle (on period), the operation of $C_S$ is independent of the switch 101. Thus, the power losses associated with the resistor of conventional RCD snubber circuits are eliminated.

Figure 5:
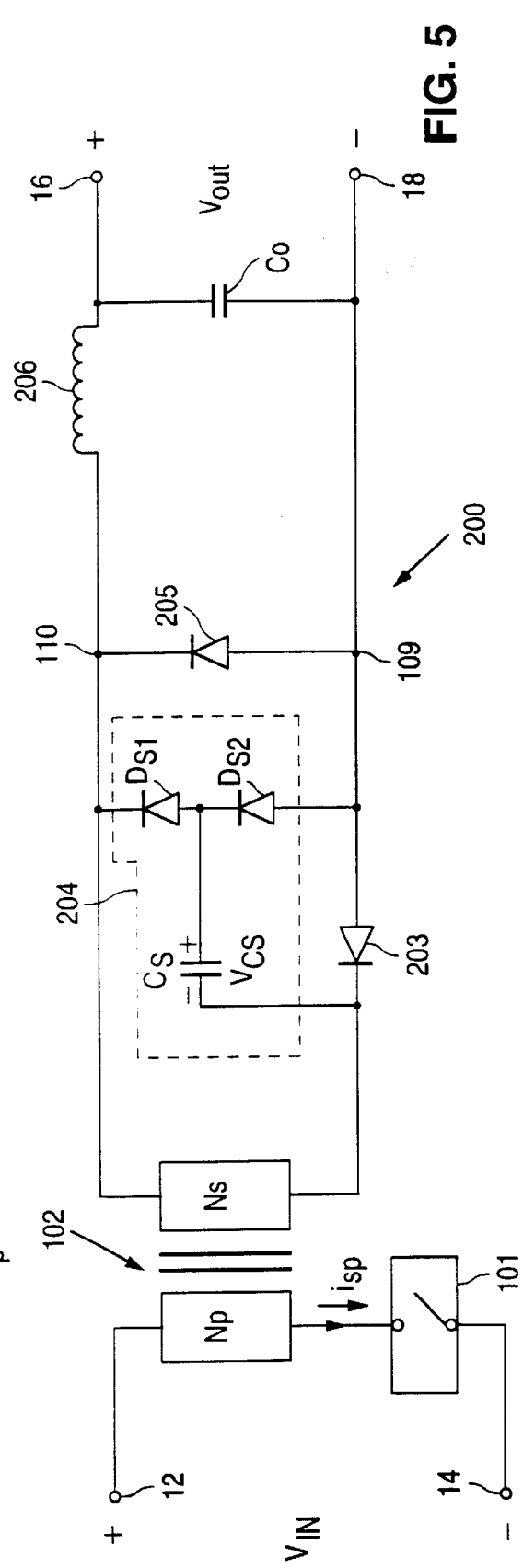
FIG. 5 is a schematic diagram of a forward converter incorporating the low loss snubber and transformer reset circuit according to a first alternate embodiment of the present invention.

FIG. 5 is a diagram of a forward converter 200 incorporating a low loss snubber and transformer reset circuit according to an alternate embodiment of the present invention. As illustrated in FIG. 5, the circuit 204 is configured in a mirror image fashion to the low loss snubber and transformer reset circuit 104 illustrated in FIG. 2. More specifically, in the circuit of FIG. 5, the snubber capacitor $C_S$ is coupled between the midpoint of the series interconnected first and second snubber diodes $D_{S1}$, $D_{S2}$ and the cathode of a forward rectifier 203 which is connected across the negative voltage rail of the forward converter 200. The low loss snubber circuit 204 resets the transformer core and minimizes the power losses associated with the power switch 101 turning off in the same manner as described above with respect to the converter illustrated in FIG. 2.

Figure 6:
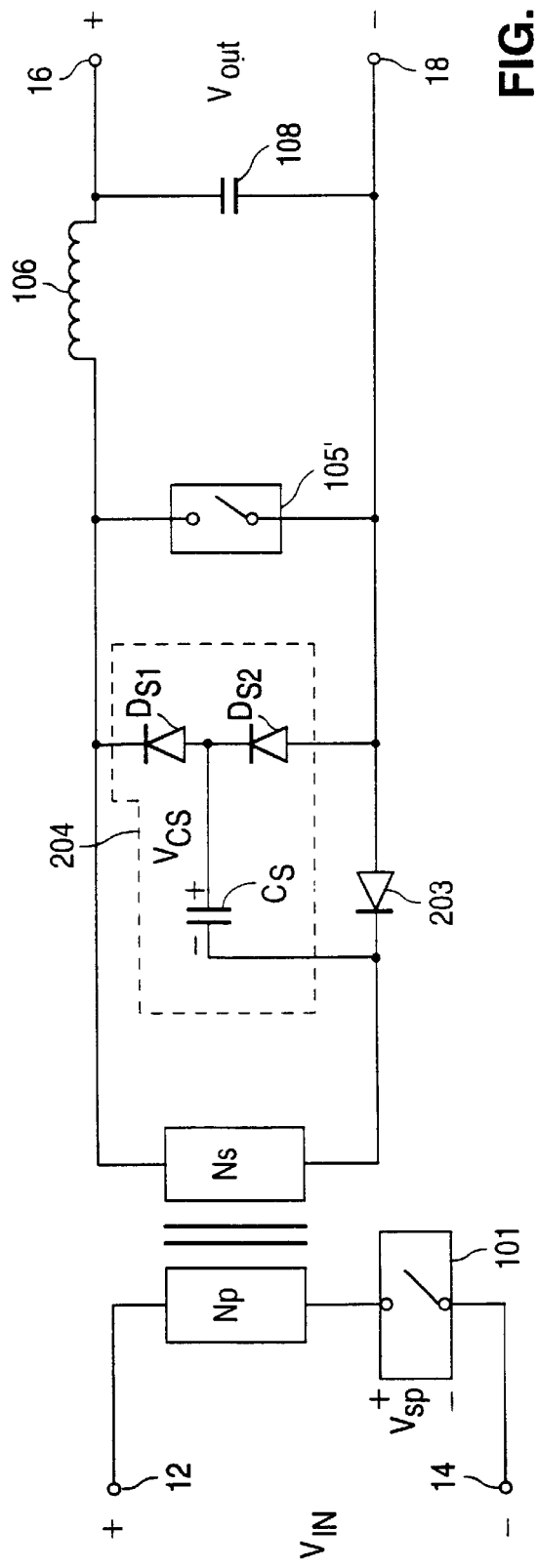
FIG. 6 is a schematic diagram of a forward converter incorporating the low loss snubber and transformer reset circuit according to a second alternate embodiment of the present invention.

FIG. 6 is a schematic diagram of a forward converter incorporating the low loss snubber and transformer reset circuit according to a second alternate embodiment of the present invention. The difference between the forward converter illustrated in FIG. 6 and the forward converter illustrated in FIG. 5 is that the free-wheeling rectifier 105 has been replaced by a switch 105'. The low loss snubber and transformer reset circuit 204 resets the transformer core and minimizes the power losses associated with the power switch 101 turning off in the same manner as described above with reference to the converter illustrated in FIG. 2.

Figure 7:
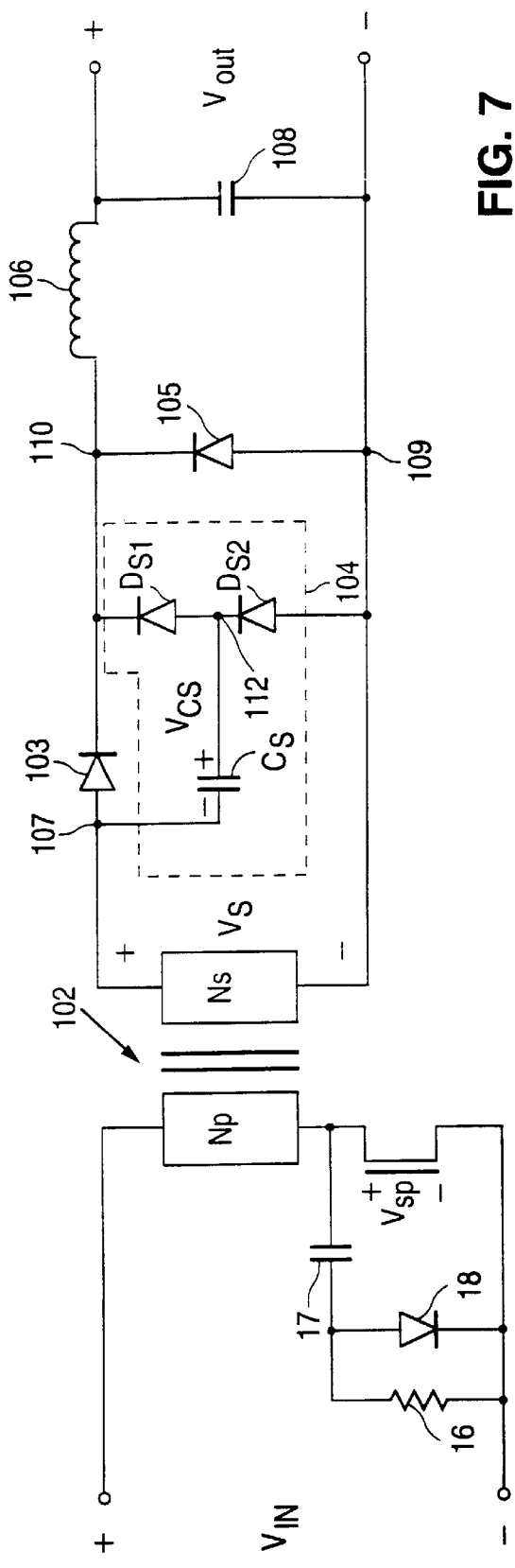
FIG. 7 is a schematic diagram of a forward converter incorporating the low loss snubber and transformer reset circuit according to a third alternate embodiment of the present invention.

FIG. 7 is a schematic diagram of a forward converter incorporating the low loss snubber and transformer reset circuit according to a third alternate embodiment of the present invention. The circuit illustrated in FIG. 7 shows the low loss snubber and transformer reset circuit 104 of the present invention being used in combination with a primary side RCD snubber network. As discussed in greater detail above, the discharging of $C_S$ is independent of load current and operates independently of the power switch 101. This means that if the primary side snubber capacitor 17 is used in the converter, it can be relatively small in size as it will only be used to limit the peak voltage due to leakage inductance in the primary winding of the transformer. In the embodiment shown in FIG. 7, the RCD network is not used to reset the transformer. Transformer reset is performed by the low loss resonant circuit 104 as described above with reference to FIG. 2.

The foregoing detailed description of the invention has been provided for the purposes of illustration and description. Although exemplary embodiments of the present invention have been described in detail herein with reference to the accompanying drawings, it is to be understood that the invention is not limited to the precise embodiments disclosed, and that various changes and modifications to the present invention are possible in light of the above teaching. Accordingly, the scope of the present invention is to be defined by the claims appended hereto.

What is claimed is:

1. A forward converter, comprising:
   a transformer having a primary winding and a secondary winding;
   a power switch in series with said transformer and coupled to an input power source said power switch capable of being alternately switched between an on period and on off period such than an ac voltage is generated across said secondary winding in response thereto;
   an output filter operative to provide a substantially constant dc voltage to an output load;
   a forward rectifier operative to provide a forward conduction path between said secondary winding and said output filter during, said on period;
   a free-wheeling rectifier operative to provide a secondary side current path in connection with said output filter; and
   a snubber circuit coupled between said secondary winding and said free-wheeling rectifier and operative to reset said transformer during said off period.

2. The forward converter of claim 1, wherein said free-wheeling rectifier is a diode.

3. The forward converter of claim 1, further including a snubber network coupled across the primary winding of said transformer.

4. A forward converter, comprising:
   a transformer having a primary winding and a secondary winding;
   a power switch in series with said transformer and coupled to an input power source, said power switch capable of being alternately switched between an on period and on off period such than an ac voltage is generated across said secondary winding in response thereto;
   an output filter operative to provide a substantially constant dc voltage to an output load;
   a forward rectifier operative to provide a forward conduction path between said secondary winding and said output filter during said on period;
   a free-wheeling rectifier operative to provide a secondary side current path in connection with said output filter; and
   a snubber circuit coupled between said secondary winding and said free-wheeling rectifier and operative to reset said transformer during said off period, wherein said snubber circuit includes a first snubber diode connected in series with a second snubber diode, said series combination of the first and second snubber diodes coupled in parallel across said free-wheeling rectifier, and a capacitor coupled between the midpoint of said first and second snubber diodes and said secondary winding.

5. The forward converter of claim 4, wherein said forward rectifier is a diode having an anode coupled to a terminal of said snubber capacitor and said secondary winding and a cathode coupled to the cathode of said first snubber diode.

6. A forward converter, comprising:
   a transformer having a primary winding and a secondary winding;
   a power switch in series with said transformer and coupled to an input power source, said power switch capable of being alternately switched between an on period and on off period such than an ac voltage is generated across said secondary winding in response thereto;
   an output filter operative to provide a substantially constant dc voltage to an output load;
   a forward rectifier operative to provide a forward conduction path between said secondary winding and said output filter during said on period;
   a free-wheeling rectifier operative to provide a secondary side current path in connection with said output filter; and
   a snubber circuit coupled between said secondary winding and said free-wheeling rectifier and operative to reset said transformer during said off period, wherein said snubber circuit includes a first snubber diode connected in series with a second snubber diode, said series combination of the first and second snubber diodes coupled in parallel across a synchronous rectifier, and a capacitor coupled between the midpoint of said first and second snubber diodes and the cathode of said forward rectifier.

7. A forward converter, comprising:
   a transformer having a primary winding and a secondary winding;
   a power switch in series with said transformer and coupled to an input power source, said power switch capable of being alternately switched between an on period and on off period such than an ac voltage is generated across said secondary winding in response thereto;
   an output filter operative to provide a substantially constant dc voltage to an output load;
   a forward rectifier operative to provide a forward conduction path between said secondary winding and said output filter during said on period;
   a switch operative to provide a secondary side current path in connection with said output filter; and
   a snubber circuit coupled between said secondary winding and said switch and operative to reset said transformer during said off period, wherein said snubber circuit includes a first snubber diode connected in series with a second snubber diode, said series combination of the first and second snubber diodes coupled in parallel across said switch, and a capacitor coupled between the midpoint of said first and second snubber diodes and said secondary winding.

8. The forward converter of claim 7, wherein said switch is a MOSFET.

* * * * *